(12) United States Patent
Jacot et al.

(10) Patent No.: US 10,710,206 B2
(45) Date of Patent: Jul. 14, 2020

(54) MACHINING MODULE, ACCESSORY ASSEMBLY FOR A MACHINING MODULE AND METHOD FOR STARTING UP A MACHINING MODULE

(71) Applicant: Watch Out SA, Geneva (CH)

(72) Inventors: Philippe Jacot, Bevaix (CH); Sebastien Laporte, Thyez (FR)

(73) Assignee: WATCH OUT SA, Genève (CH)

( * ) Notice: Subject to any disclaimer, the term of this patent is extended or adjusted under 35 U.S.C. 154(b) by 136 days.

(21) Appl. No.: 15/580,782

(22) PCT Filed: Jun. 9, 2016

(86) PCT No.: PCT/IB2016/053383
§ 371 (c)(1),
(2) Date: Dec. 8, 2017

(87) PCT Pub. No.: WO2016/199046
PCT Pub. Date: Dec. 15, 2016

(65) Prior Publication Data
US 2018/0222004 A1    Aug. 9, 2018

(30) Foreign Application Priority Data

Jun. 11, 2015 (CH) ......................... 832/15

(51) Int. Cl.
*B23Q 17/24* (2006.01)
*B23Q 3/18* (2006.01)
*B23Q 17/22* (2006.01)

(52) U.S. Cl.
CPC ............. *B23Q 17/24* (2013.01); *B23Q 3/186* (2013.01); *B23Q 17/22* (2013.01)

(58) Field of Classification Search
CPC ....................................................... B23Q 17/24
(Continued)

(56) References Cited

U.S. PATENT DOCUMENTS 3,282,138 A    11/1966   Stockmann et al.
3,555,690 A     1/1971   Matthey
(Continued)

FOREIGN PATENT DOCUMENTS

CN    203356622 U    12/2013
DE    1602821 A1      8/1970
(Continued)

OTHER PUBLICATIONS

International Search Report for PCT/IB2016/053383 dated Aug. 10, 2016.
(Continued)

*Primary Examiner* — Kara E. Geisel
*Assistant Examiner* — Omar H Nixon
(74) *Attorney, Agent, or Firm* — Pearne & Gordon LLP

(57) ABSTRACT

System for machining workpieces including a setting-up module and a machining module for the production of components. The setting-up module includes at least one first tool holder fixing device for fixing at least one tool holder removably, and at least one first workpiece support fixing device for fixing a workpiece support removably. The machining module includes at least one second tool holder fixing device for fixing at least one tool holder removably and at least one second workpiece support fixing device for fixing a workpiece support removably, such that the tool holder and the workpiece support can both be transferred from the setting-up module to the machining module after setting up.

24 Claims, 8 Drawing Sheets

(58) Field of Classification Search
USPC .......................................................... 356/614
See application file for complete search history.

(56) References Cited

U.S. PATENT DOCUMENTS

| | | | |
|---|---|---|---|
| 3,625,097 A | 12/1971 | Harkness | |
| 3,867,763 A | 2/1975 | Wilkins | |
| 4,776,247 A | 10/1988 | Kiya | |
| 2002/0129682 A1* | 9/2002 | Muller | B23B 27/00 82/1.11 |
| 2002/0189379 A1* | 12/2002 | Hjelm | B23Q 17/00 73/865.9 |
| 2006/0232791 A1* | 10/2006 | Turrini | B23Q 17/22 356/621 |
| 2007/0229853 A1* | 10/2007 | Cheng | B23Q 17/2233 356/625 |
| 2009/0254211 A1* | 10/2009 | Monnin | B23B 25/06 700/186 |
| 2010/0076589 A1* | 3/2010 | Hu | B23Q 17/22 700/192 |
| 2011/0015885 A1* | 1/2011 | Matsubara | B23Q 17/20 702/66 |
| 2011/0083333 A1 | 4/2011 | Esaka et al. | |
| 2013/0104707 A1* | 5/2013 | Nakagawa | B23Q 11/0007 82/118 |
| 2013/0325162 A1* | 12/2013 | Valsecchi | B23Q 11/0007 700/160 |
| 2015/0174662 A1 | 6/2015 | Zabel et al. | |

FOREIGN PATENT DOCUMENTS

| | | |
|---|---|---|
| DE | 10251829 A1 | 5/2004 |
| EP | 1566240 A | 8/2005 |
| EP | 2308641 A1 | 4/2011 |
| JP | 2010099801 A | 5/2010 |
| JP | 2012213840 A | 11/2012 |
| JP | 2014507292 A | 3/2014 |

OTHER PUBLICATIONS

First Office Action and Search Report for corresponding Chinese application No. 201680047184.4 dated Feb. 25, 2019.
Translation of Office Action for corresponding Japanese application No. 2018-516651 dated Aug. 7, 2019.

* cited by examiner

MACHINING MODULE, ACCESSORY ASSEMBLY FOR A MACHINING MODULE AND METHOD FOR STARTING UP A MACHINING MODULE

The present invention relates to a machining module, for example to a module that machines by removing chips, for example a turning machine (lathe) or a transfer machine.

PRIOR ART

The manufacture of components using machining modules (machine tools), notably bar turning machines, automatic lathes, milling machines and transfer machines typically involves three distinct phases:

In a first, setting-up (or pre-setting) phase, the operator (for example a lathe operator) uses a machining module to define and test the machining plan, namely the succession of operations and axis movements needed in order to obtain the desired component from the workpiece. The operator for example takes care to obtain a machining plan that is as efficient as possible, namely the one that allows a given component to be machined from the workpiece using a minimum number of operations and avoiding collisions between tools or between tool and workpiece. He selects the tools to be used and checks the quality of the components obtained, for example the surface finishes, compliance with tolerances, etc.

In a second production phase, a production series of components are produced on the pre-set machining module using the parameters defined during the setting-up. This phase is the only productive phase; it is often carried out 24 hours a day, the machining module being fed with raw material by means of a feeder or stock (raw material) loader.

Sometimes the production of a production series of components is interrupted, for example in order to produce another type of component on the same machining module, for machine maintenance, etc., and then resumed later. In such instances, a start-up phase is needed in order to apply the parameters defined previously during the setting-up. This start-up is quicker than the setting-up.

During start-up, it is often necessary to replace the tools fitted to the machine with another set of tools suited to the machining that is to be performed. The precision with which these tools are positioned determines the quality of the machining, but is difficult to reproduce in successive start-ups.

In particular, it is difficult to guarantee that machining on different machining modules will produce the same results, even if the tools or tool holders are transferred from one module to the other. This is because the positioning of the barrel or other workpiece support also varies from one module to another.

Setting-up is generally performed on the machining module intended for production, so as to ensure that this production is performed using the pre-set parameters that will make it possible to obtain the results tested during the setting-up. This results in an interruption to production (which means to say downtime) and ties up the production machine for the time taken to perform the setting-up.

Various solutions have therefore been proposed in the prior art in order to reduce the duration of this setting-up phase or that of the start-up.

DE1602821 A1 for example describes an external setting-up device. This device allows setting-up to be performed away from the machine tool, and allows the parameters obtained to be tested before the production phase on the production machine. The setting-up is performed using a tool mounted on a removable tool holder which is then transferred to the production machine so as to ensure that the quality of the production is not affected by a change in tool or a change in positioning of the tools in their tool holder.

U.S. Pat. No. 3,282,138A describes a numerical control machine tool. A numerical positioning device makes it possible to correct the positioning of a removable tool holder by recording the required positioning parameters on punched tape. This solution suffers from the same problems as the above document and only allows correcting of the differences in positioning of the tools.

U.S. Pat. No. 4,776,247 describes another numerical approach making it possible during production to reproduce the tool positions predetermined during setting-up, and therefore making it possible to reduce the start-up time.

U.S. Pat. No. 3,625,097A describes a method for pre-setting tools with respect to their tool holder. The method employs an external setting-up device with removable tool holders that can then be transferred to the production machine tool. The machine tool correctly reproduces the relative positions between the tool holders.

U.S. Pat. No. 3,555,690A relates to a simulation device allowing the pre-setting of a machine tool, using an external setting-up device.

U.S. Pat. No. 3,867,763A describes a device for pre-setting a machine tool, using an external setting-up device with removable tool holders.

EP1566240A describes an alignment device allowing the orientation of a machine to be controlled manually with respect to the surface of a workpiece, this being achieved using the direction following reflection of a beam of light off this surface.

EP2308641A relates to a tool holder for adapting a measuring tool in a measuring device, making it possible to calibrate the position of a component in the tool holder.

DE10251829A relates to an arrangement for measuring the thermal drift that affects the relative positioning between a tool of the machine tool and the workpiece, by means of reference marks fixed to the machining bed.

These various solutions thus make it possible to set up and test a machining plan away from the machining module intended for production. They also allow the tools and their assembly on the tool holder to be tested, and make it possible to ensure that the precise assembly of the tools on their tool holder is reproduced during production.

Despite everything, these solutions do not make it possible to ensure perfect repeatability of the results on the production machine; this is because it is difficult to ensure perfect repositioning of the tools with respect to the workpiece.

BRIEF SUMMARY OF THE INVENTION

It is one object of the present invention to propose a machining module, an assembly of accessories for a machining module and a start-up method for a machining module, which are free of the limitations of the prior art.

According to the invention, these objects are notably achieved by means of an assembly of accessories for a machining module that machines by the removal of chips, comprising:

at least one tool holder equipped with a first target as positioning reference;

a workpiece support equipped with a second target as positioning reference;

the first and second targets being designed to collaborate so as to allow their relative position to be measured.

The first and second positioning references make it possible to check the position and direction of travel of the tool holder or holders with the workpiece support. This then guarantees precise mutual alignment and/or positioning independently of the positioning and alignment with respect to the bed of the machining module. Any positioning and/or direction errors can be compensated for.

The collaboration between the targets may include the mutual superposition thereof.

Targets designed to collaborate may for example be targets arranged in such a way that superposition thereof allows easier measurement of their relative position.

The tool holder may be fixed removably to a carriage (clamping block) of the machining module. To this end, it may for example comprise removable fixing means, for example one or more pins, or portions, for example reference surfaces or holes, intended to collaborate with the movable carriage.

The tool holder may comprise several tools fixed removably.

The workpiece support may be designed to be mounted removably on a machining module. To this end, it may for example comprise removable fixing means, or portions, for example reference surfaces or holes, able to collaborate with removable fixing means associated with an external machining module.

The feedstock support may be a barrel of a bar turning machine (an automatic lathe).

The feedstock support may be a clamp or a chuck.

The feedstock support may be a pallet or a pallet truck.

It is also possible to integrate or fix the target on the workpiece.

The first and second positioning references make it possible to determine the relative positioning of the workpiece support and of the tool holder, and to correct same if it does not correspond to the expected value. Likewise, the actual direction of travel of the tool holder (for example when an instruction to move in a given direction is issued) can be measured and stored in memory.

The workpiece support is then said to be pinned to the tool holder: these two elements are then aligned and positioned precisely relative to one another, at the same distance and with the same orientation.

The tool holder or tool holders and the workpiece support may be transferred not only between various machining modules but also between a setting-up module and a machining module.

This solution also offers the advantage over the prior art of allowing transfer not only of the tool holder, but also of the workpiece support, between a setting-up module and a machining module. This then ensures that machining will be performed with the tool holder and the workpiece support previously tested on a setting-up module; any deficiencies of the workpiece support, for example inaccuracies in positioning, concentricity, etc. can thus be measured during setting-up, and corrected or compensated for during production.

The first and second positioning references may consist of optical targets. Mutual alignment of these superposed targets guarantees correct positioning of the tool holder with the workpiece support. The position checking system may comprise a camera filming the superposed targets, and a computerized image analysis module.

Other types of target and other types of position checking systems can be employed, including systems based on a matrix sensor, capacitive, inductive, resistive or mechanical systems for example.

The position checking devices make it possible to check the positioning of the tool holder and of the workpiece support in a single X-Y plane, and possibly the direction of travel theta in this plane. This then avoids the difficulty of positioning and orientation in the Z axis, which is generally less sensitive. This then results in a device that is more economical and simpler to align.

In another embodiment, when precise positioning of the tools and of the workpiece in Z is also required, the position checking device may be designed also to allow precise positioning in one or more planes including the Z-axis.

Another subject of the invention is a machining module comprising:

at least one tool holder equipped with a first positioning reference;

a workpiece support equipped with a second positioning reference;

a position checking device for checking the positioning of the first positioning reference with the second positioning reference.

The first and second positioning references may consist of optical targets.

The machining module may comprise a position checking device to check the positioning of the positioning references.

The position checking device may be fixed and associated with the bed of the machining module.

The position checking device may be removable.

The position checking device may for example comprise a camera to check the alignment of the optical targets. The camera may capture a 2D image of the superposed targets. An image processing module may analyze the image of the superposed targets and send alignment correction signals to the numerical control of the machining module.

In the case of an optical system, the measurement may be made by checking the position of components immersed in a liquid, for example in oil. This then avoids measurement errors caused by any splashes of cutting oil or by the presence of chips or dirt.

The machining module may comprise a position correction device for positioning at least one tool holder with respect to said workpiece support. This movement may be performed manually, for example using one or more micrometer screws, and/or motorized. It may be performed along multiple axes, for example along the X and Y axes of the machining module, and/or about axes of rotation. The movement of the tool holder or tool holders may be performed in a plane parallel to the plane of the targets.

Another subject of the invention is a method for starting up a machining module for the production of a series of specific components, comprising:

selection of an assembly of accessories intended for the machining of said specific components;

mounting the workpiece support on a bed of the machining module;

mounting at least one tool holder on said bed;

positioning said tool holder in such a way as to align one said positioning reference associated with a tool holder with a positioning reference associated with the workpiece support.

BRIEF DESCRIPTION OF THE FIGURES

Exemplary embodiments of the invention are given in the description illustrated by the attached figures in which.

DETAILED DESCRIPTION

Figure 1:
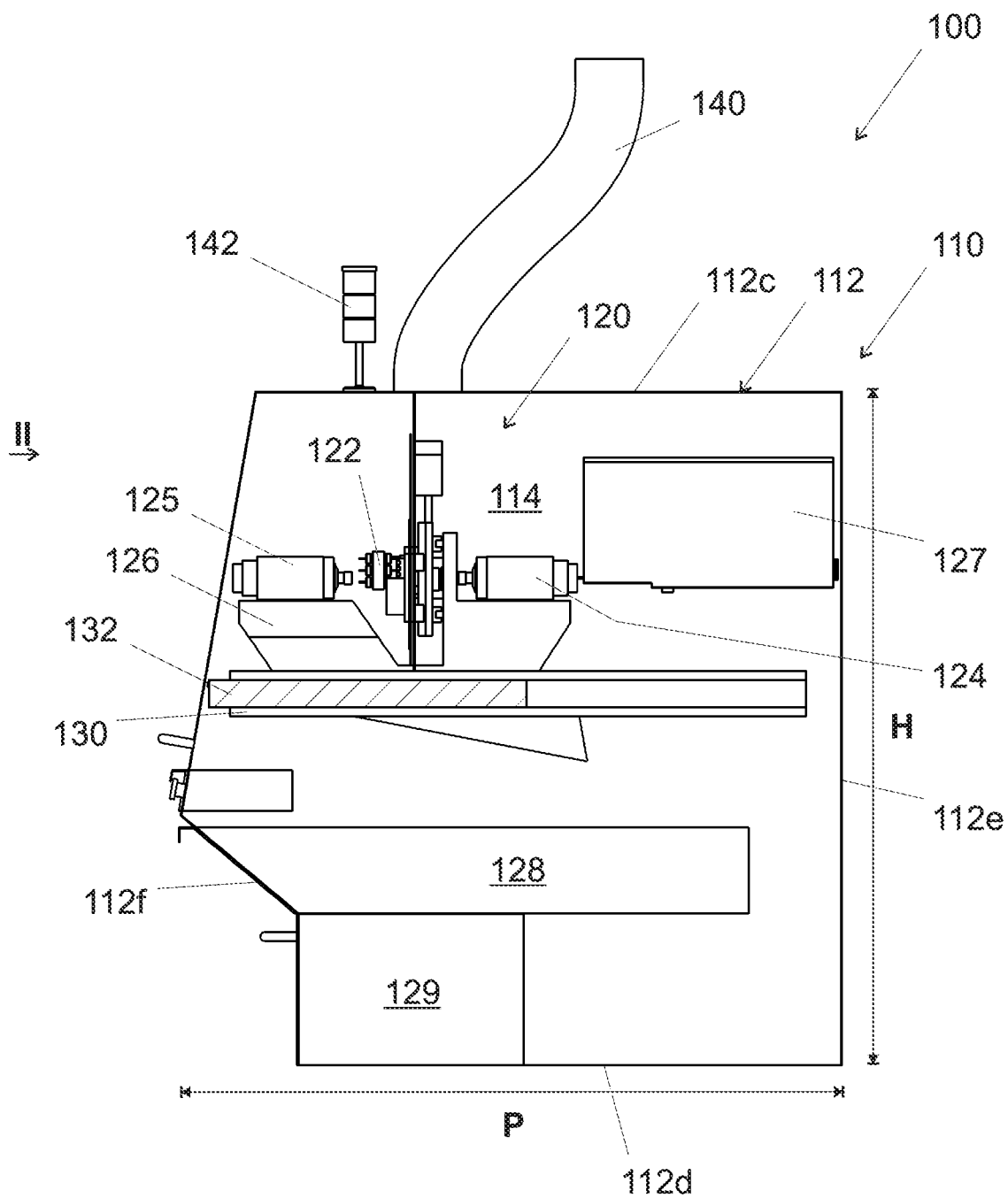
FIG. 1 illustrates a view in cross section of a machining module according to one embodiment of the invention.

The machining module 110 illustrated in FIG. 1 forms a compact unit delimited by a protective cover 112 constituting a closed casing delimiting an enclosure 114 that can be rendered relatively fluidtight. This protective cover 112 comprises two mutually parallel vertical sidewalls 112a and 112b, a horizontal top wall 112c parallel to a bottom wall connected to the bed 112d, a vertical rear wall 112e and a multi-faceted front wall 112f comprising a front door.

A window in the front wall 112f allows sight of the enclosure 114 notably enclosing a machining assembly 120. This machining assembly 120 comprises at least one tool holder 122, a headstock spindle 124 and a tailstock quill (counter spindle) 125. The tool holder or tool holders 122 are mounted removably on a motorized clamping block or carriage that is able to move, as will be seen.

The machining assembly 120 is mounted on a movable carriage 130. In the figure, this movable carriage 130 takes the form of a slide or drawer. The carriage 130 may form a receptacle able to collect any lubricating liquid, notably oil, and the chips of material resulting from the machining of a workpiece by the machining assembly. In order to allow this carriage 130 to advance out of the enclosure 114 and retreat into the enclosure, this carriage is mounted on guide means 132. In particular, these guide means 132 may take the form of rails.

The machining assembly 120 is placed on a support base 126 on which the headstock spindle 124 and the tailstock quill 125 are mounted, together with the removable tool holder or tool holders 122. The support base 126 is housed directly on the movable carriage 130. In this way, it will be appreciated that it is possible to change a complete machining assembly 120 of a machining module, simply by detaching the support base 126 from the movable carriage 130, and fitting thereon a new support base 126 equipped with another machining assembly 120.

The machining module 110 also comprises an electrical cabinet, not depicted in the figure, situated for example on the rear wall 112e. This electrical cabinet is positioned inside the enclosure 114 or outside the enclosure 114. The enclosure 114 also comprises a chip pan 128, underneath the carriage 130, and an oil pan 129, underneath the chip pan 128. In order to collect oil and chips in the dedicated pans 128 and 129, the bottom of the carriage 130 has holes. A chute attached to the carriage may be provided for guiding the chips.

Also, the machining module 110 has a vapor extraction system for extracting vapors present in the enclosure and which is fitted with a vapor extraction duct 140.

Figure 2:
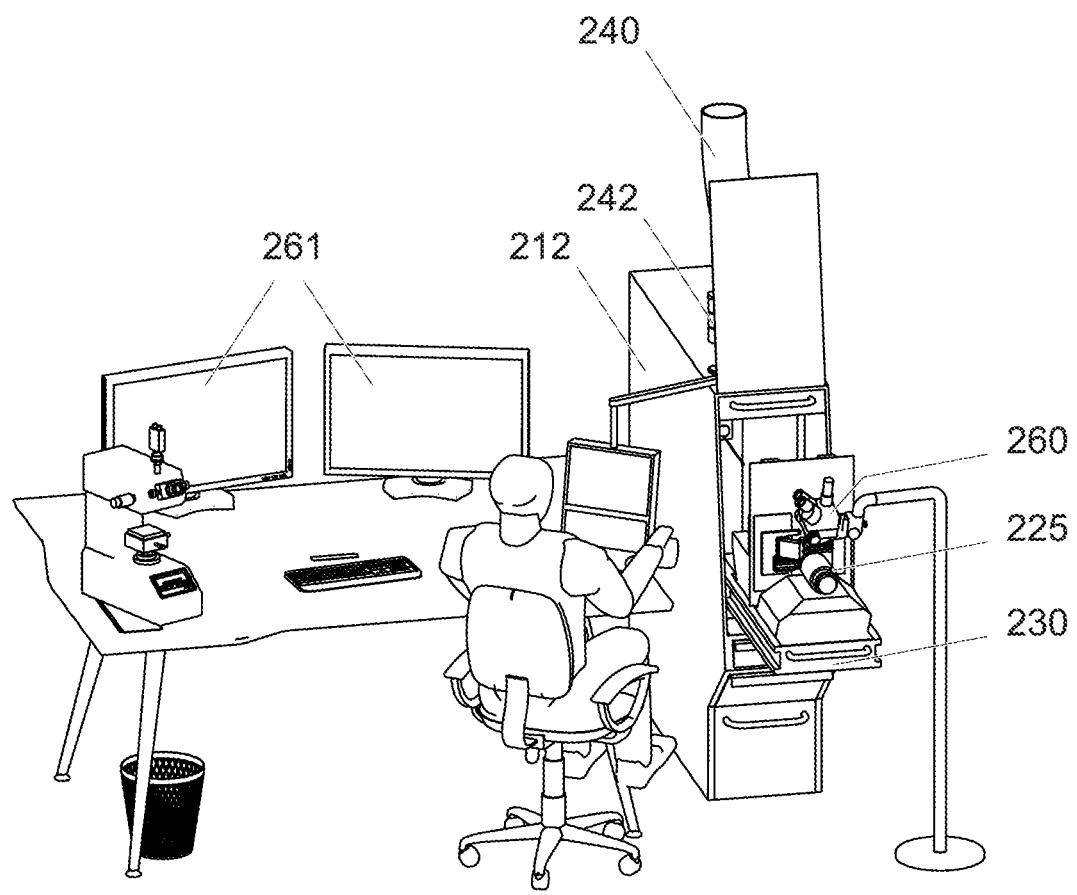
FIG. 2 illustrates a perspective view of a setting-up module according to one embodiment of the invention.
Figure 3:
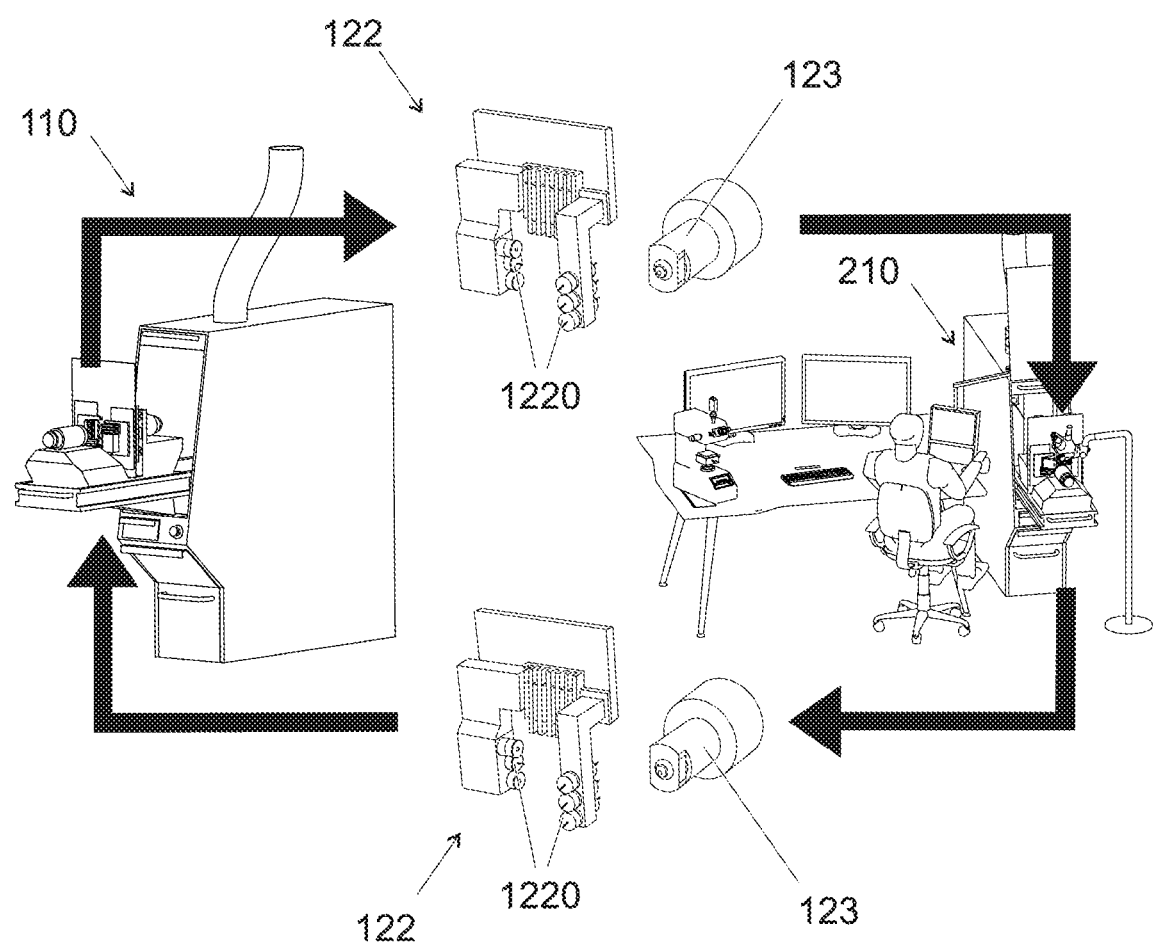
FIG. 3 schematically illustrates the transfer of the tool holder and of the workpiece support between a setting-up module and a machining module.

In order to facilitate a visual check of the operating status of each machining module 110, a visual indicator of the operating status, such as a warning lamp 142 is optionally provided (see FIGS. 1 to 3).

The machining module 110 further comprises a barstock magazine 127 situated inside the enclosure 114, to the rear of the machining assembly 120. This barstock magazine 127 feeds the machining assembly 120 bar by bar, in the fashion of a magazine of cartridges used in a weapon. Thus, this barstock magazine 127 forms a feeder for the machining assembly 120, feeding the workpiece support 123 with raw feedstock, therefore from the rear of the machining module 110 (from the right in the figures). Series of bars of different diameters and/or of different materials that are already prepared, allow the operator to reload the magazine 127 quickly and easily.

The bars may have a length less than 1 meter. With fairly short barstock, not only is the footprint of the magazine 127 reduced, but a contribution is also made to reducing vibrations during the machining of the bar, and this improves the stability of the machining method and therefore ensures good quality machining. In addition, the short size of the bar allows the bar to be fed in as far as the workpiece support 123 without special guide means.

FIG. 2 illustrates a setting-up module 210 according to one embodiment of the invention. Numerous elements of this setting-up module are similar or identical to those of the machining module 110 and will not be described further in detail. The setting-up unit 210 notably comprises a carriage 230 able to move inside the protective cover 212 and allowing extraction or introduction of the machining elements, notably a spindle similar to the spindle 124 with its workpiece support, a tail stock quill 225 and the tool holders detailed later on. The element 240 is a duct for evacuating vapors, 242 is an indicator light signaling whether the setting-up module is on or off. All the other elements of the machining module as described in conjunction with FIG. 1 may be present in the setting-up module. However, since this module is not intended for mass-production of components, it is however possible to simplify certain elements intended for rapid or mass production; for example, it is possible to provide a feeder that is smaller or not as quick, smaller air and oil collecting pans, etc.

The setting-up module 210 further comprises at least one high resolution camera and/or at least one sensor that the machining module 110 does not have, so as to set up the machining on this module and check the quality of the components produced. This sensor may for example comprise a feeler, a roughness meter, a gauge, a height-measuring column, a vision system based on one or more high-resolution and/or high frequency cameras, etc. The measurement results may be displayed on one or more screens 261.

The tools are distributed in groups of tools 1220, each group of tools comprising one or more tools next to one another. One or more groups of tools are attached to one and the same tool holder 122. The machine may comprise several tool holders 122. At least one of these tool holders is mounted removably, for example using pins, on a movable carriage (referred to as clamping block) of the setting-up module 210 and of the machining module 110 respectively. It is thus possible to transfer a tool holder 122 from one module to the other, as illustrated schematically in FIG. 3. In the same way, the workpiece support 123 is mounted removably, using a fixing device 1232, on the setting-up module 210 and on the machining module 110, so that it can be transferred from one module to the other. Position correction devices optionally make it possible to compensate the relative position of the or each tool holder with respect to the workpiece support, as will be seen later.

One or more tools may be mounted removably on the corresponding tool holder. The relative position of each tool with respect to the tool holder 122, and/or the position of the cutting edge, may be measured and stored digitally, so as for example to apply a suitable digital correction in the event of a placement error, using correction and measurement elements known per se and distinct from the tool holder position compensation means.

The workpiece support 123 may for example comprise a barrel or guide bush, namely an element capable of guiding a bar of stock material held by the spindle, a chuck or a clamp capable itself of holding the stock material. Optionally, the workpiece support comprises a barrel (or guide bush) that can be converted into a clamp.

After a machining plan has been set up, the removable tool holder 122 and the removable workpiece support 123 can therefore be transferred from the setting-up module 210 to the machining module 110. This then guarantees that the machining will be performed with the tool holder and with the workpiece support which were used to obtain the qualities and results tested and approved during setting-up. Deficiencies associated with the change in tool holder or change in workpiece support are thus avoided. Optionally, a tool holder and a workpiece support which have been used for setting up a particular component are associated with this component and its component schedule in a list, and used only for machining this component; this kit is stored between two production runs of machining this component.

Figure 4:
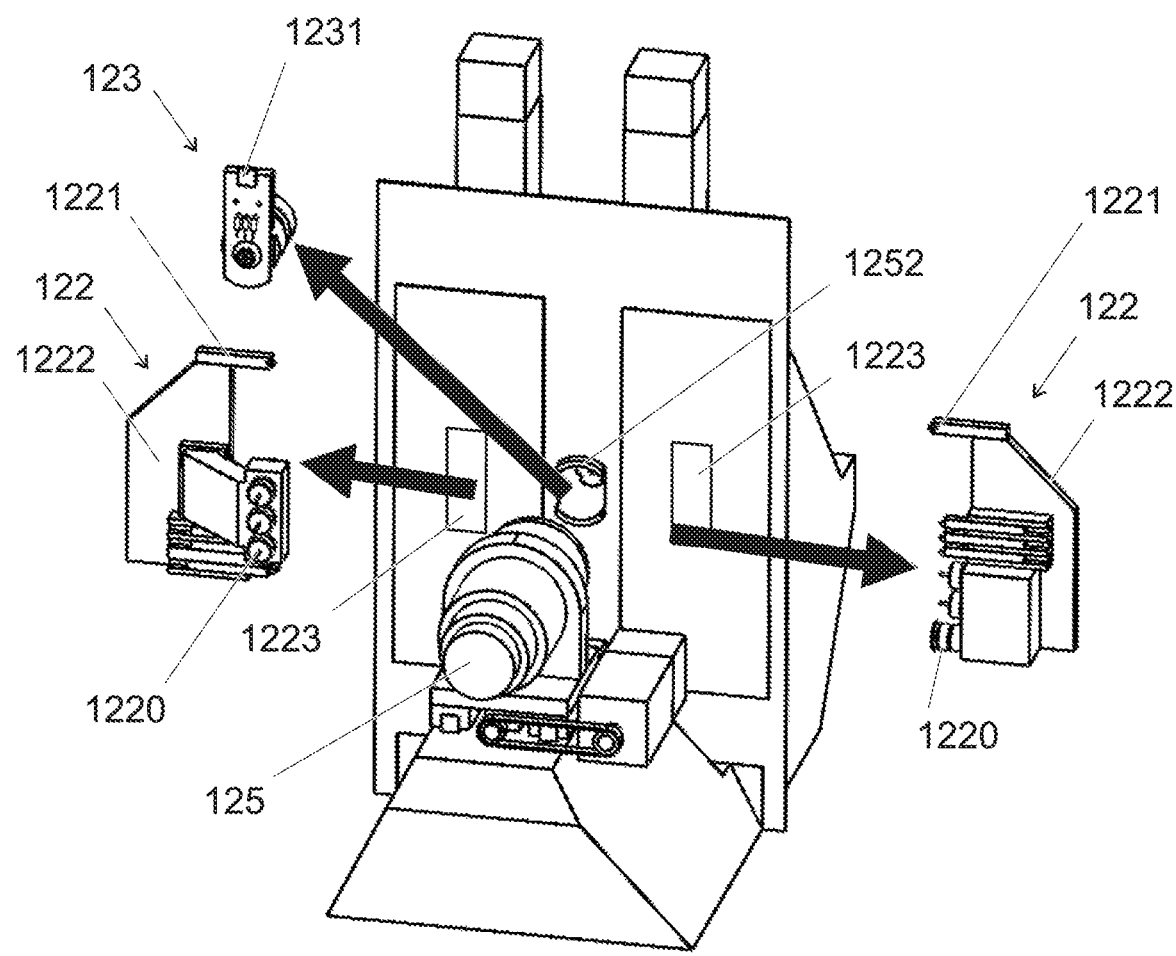
FIG. 4 schematically illustrates the mounting of the tool-holders and of the workpiece support on a setting-up module or on a machining module.

FIG. 4 schematically illustrates the mounting of two tool holders 122 and of one workpiece support 123 on a module, for example a setting-up module or a machining module.

Each tool holder 122 is fixed to a carriage (clamping block) of the module 110 or 210 respectively, by means of a fixing device 1223, so that it can be moved and its position corrected in a motorized manner. Errors in the positioning of the tool holder 122 with respect to the carriage, or differences in positioning with respect to the positioning on the setting-up machine, are thus compensated for by altering the movement of the carriage accordingly.

Each tool holder 122 further comprises a positioning reference 1221, for example, but nonlimitingly, an optical target mounted on a target support 1222, as will be seen later on. Several distinct positioning references will optionally be provided when the machine comprises several tool holders 122 on several carriages (clamping blocks). In the same way, the workpiece support 123 is mounted by means of a fixing device 1232 and also comprises a positioning reference 1231, for example another optical target detailed later on. The relative positioning of the positioning references associated with each tool holder and with the workpiece support can be checked, for example using a viewing system associated with the bed and which makes it possible to measure the difference along the axes x and y between the positioning references 1221 and 1231. In one possible embodiment, the system commands a movement of the tool holder carriage in a predetermined direction and measures the difference theta between the actual direction of movement measured on the image and the instructed direction. It is thus possible to compensate for errors in the orthogonality of the axes x and y.

The errors thus measured for the positioning and direction of travel are compensated for, for example by means of the axes of this tool holder, so as during machining to obtain a relative positioning and a relative orientation of the tool holders and of the workpiece support that correspond to the values used during setting-up.

Figure 5:
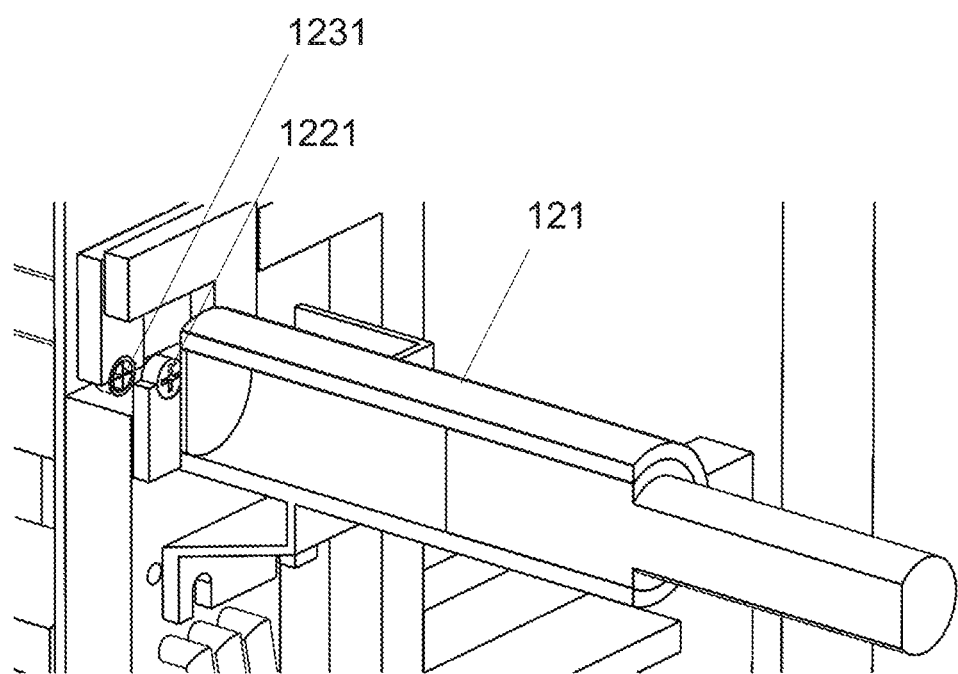
FIG. 5 illustrates a view in cross section of one example of a position checking system according to one embodiment of the invention.

FIG. 5 illustrates a perspective and partially sectioned view of the two positioning references 1221 and 1231 respectively associated with the tool holder and with the workpiece support and which are superposed when mounted on one of the modules 110 or 210. A position checking device 121 that is fixed and associated with the bed of the module 110 or 210 respectively makes it possible to check the correct relative positioning between the two targets 1221, 1231 and to compensate for this positioning in the event of error or difference with respect to the positioning used on the setting-up machine. The position checking device 121 may consist of a camera fitted with an objective lens of microscope type, or of an optical system capable of capturing an image of the superposed various optical targets 1221, 1231, so as to check the relative positioning thereof. A computerized sighting system makes it possible to measure the distance x, y and the error in direction of travel theta between the targets 1221 and 1231, so as to apply a corresponding compensation.

It is also possible, although less advantageous, to provide a position checking device, for example a camera, attached to a tool holder or to the workpiece support. However, that solution requires one checking device per tool holder or per support.

Likewise, it is also possible to provide a target associated with the workpiece support on the tailstock quill 125, and a target associated with one or more tool holders operating in opposition, so as to check their relative positioning and/or positioning relative to the main workpiece holder 123.

Figure 6:
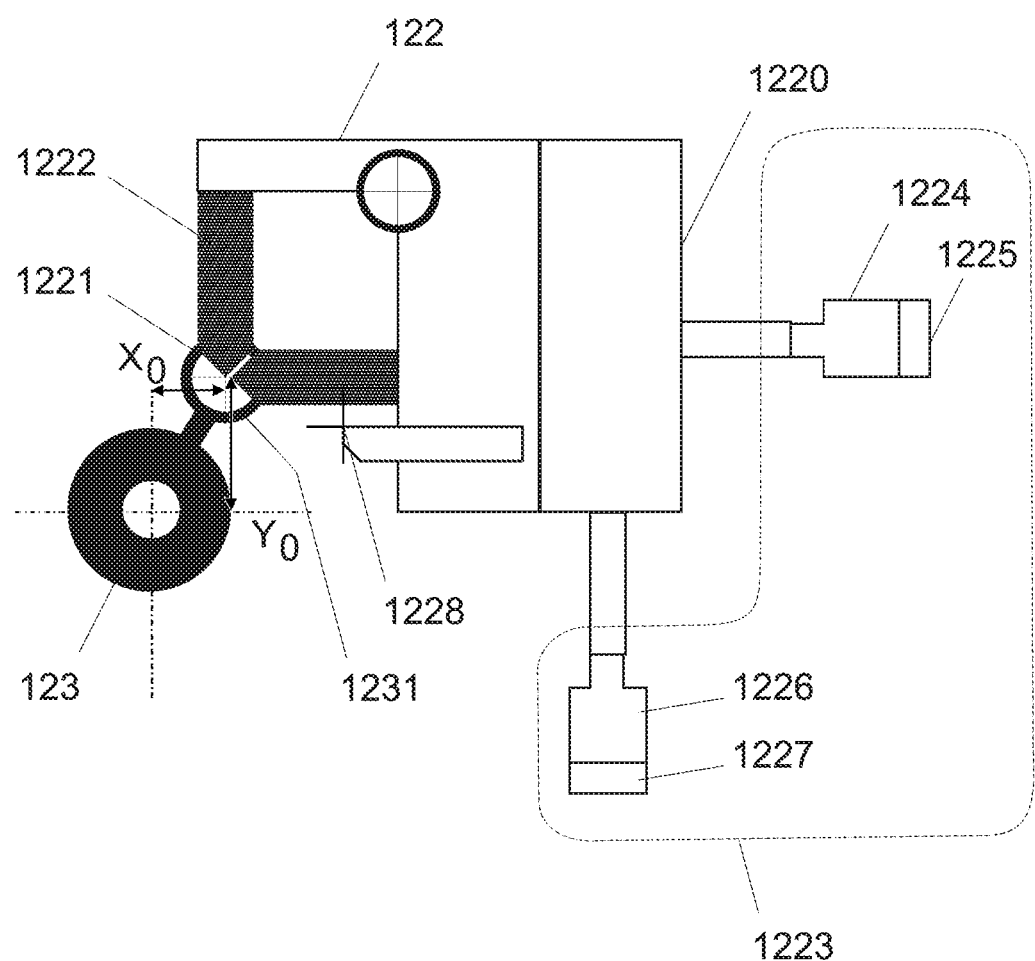
FIG. 6 schematically illustrates one example of a position checking system according to one embodiment of the invention.

FIG. 6 schematically illustrates the superposition of the target 1231 associated with the workpiece support 123 (for example a barrel/guide bush or a spindle) and of the target or targets 1221 associated with one or more tool holders 122. As can be seen, the target 1231 associated with the workpiece support is mounted so that it is off-centered with respect to the barrel 123, the axis of this target nevertheless being parallel to that of the barrel. In the same way, the target 1221 mounted on each tool holder 122 is offset by means of the target supports 1222. The tool holder position correction device comprises a motor 1224, equipped with an encoder 1225 which makes it possible to correct the position $x_m$ of each tool holder along the axis x, so as to correct any potential errors in the positioning in x of the targets 1221-1231. Likewise, a motor 1226 equipped with an encoder 1227 makes it possible to correct the position $y_m$ along the y axis of each tool holder, so as to move the tool holder during machining while taking into consideration any potential errors in the positioning in x of the targets 1221-1231. Likewise, a motor 1226 equipped with an encoder 1227 allows the position $y_m$ along the axis y of each tool holder to be modified, so as to correct any potential errors in the positioning in y of the targets 1221-1231. The element 1220 is a group of tools on the tool holder able to move in x and in y, whereas the tip of one of the tools mounted on this tool holder is indicated by the reference 1228. As indicated, the position of this tip with respect to a reference of the tool holder can be measured and stored in a computerized manner. Orientation correction in the x-y plane may also be envisioned.

The targets 1221, 1231 may for example comprise cross or star patterns, or other patterns facilitating the check on the alignment of the superposed targets along the linear axes x and y, and the direction theta of travel of the target 1231 in a frame of reference associated with the workpiece support. These patterns may for example be printed by photolithography onto a glass substrate. It is also possible to print a unique identifier of each target, for example a serial number, a barcode, a datagram, etc., so that each target and therefore the tool holder or workpiece support respectively associated with this target can be easily identified thus ensuring that a particular component is correctly machined with the associated tool holder and workpiece support. The unique identifier of the tool holder can also be used to retrieve from the computer memory of the numerical control 1211 the parameters associated with this tool holder, for example the offset, zero, etc. values.

Figure 7:
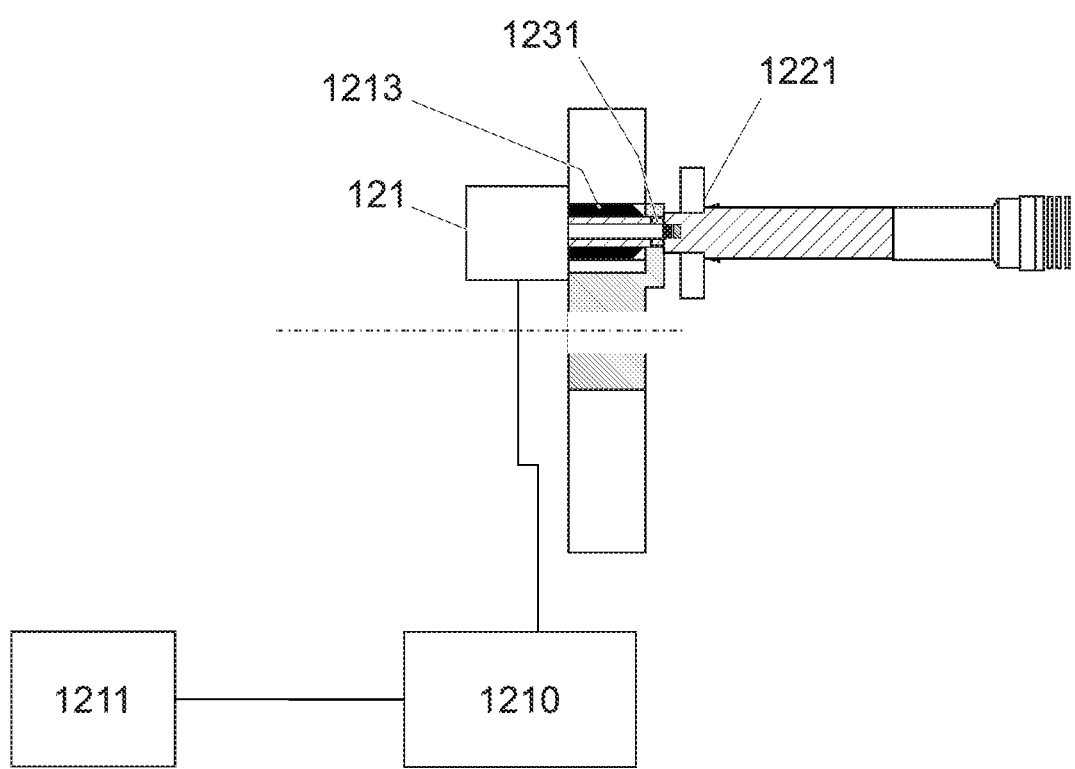
FIG. 7 schematically illustrates a position checking system according to one embodiment of the invention, the illumination being on the opposite side of the targets to the camera.

FIG. 7 schematically illustrates one embodiment of a position checking system. In this example, the position checking device comprises an objective lens of microscope type 1213 and a CCD camera 121 on one side of the targets 1221, 1231, and an illumination 1212 on the other side of the targets. The light generated by the illumination 1212 passes through the superposed targets and reaches the CCD camera 121 which captures an image or sequence of images that are enlarged by virtue of the objective lens 1213. A viewing module 1210, for example a computer program, processes the images captured by the CCD camera so as to check the alignment of the targets. The results supplied by this module may be transmitted to the numerical control 1211 which commands the setting-up module or, respectively, the machining module, and used to control the motors 1226, 1224 so as to move the tool holder or tool holders during machining to compensate for the observed error. A manual position-correction mechanism, for example using micrometer screws, may also be employed. In an alternative form, position errors in the setting-up module are not corrected, or not entirely corrected, but are stored in connection with the targets concerned, so that this error can be reproduced during production on the machining module.

Figure 8:
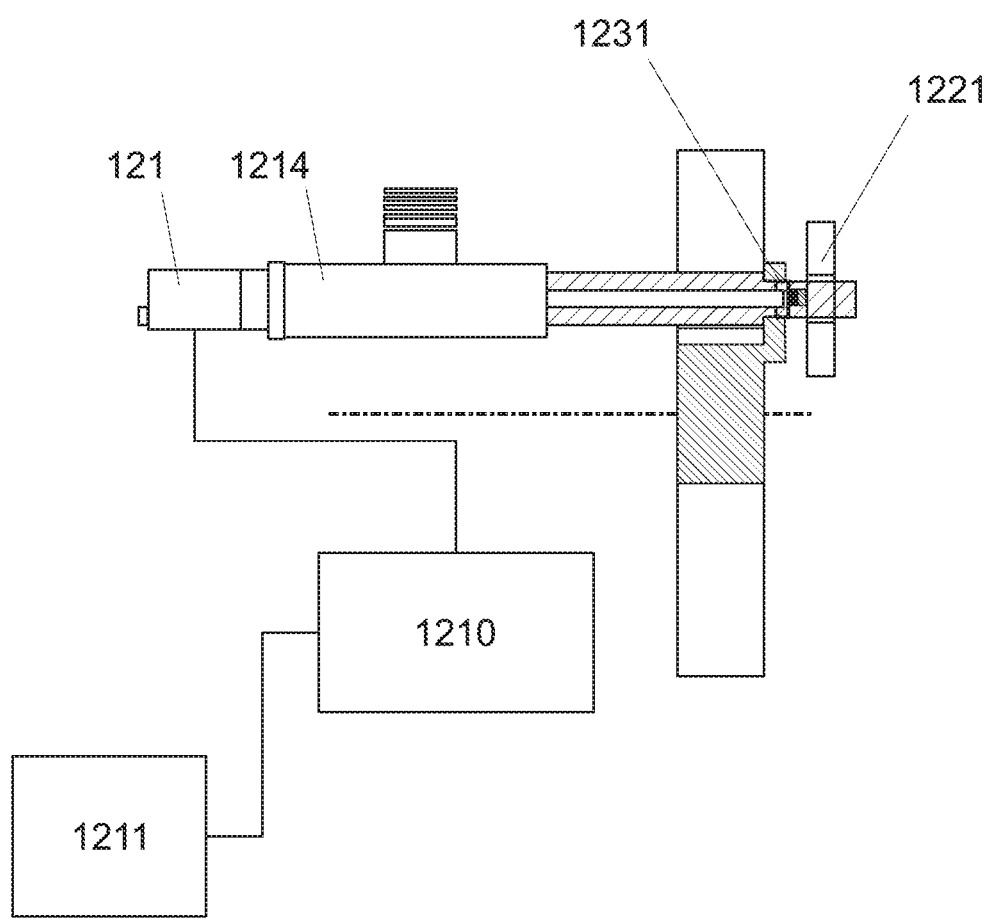
FIG. 8 schematically illustrates a position checking system according to one embodiment of the invention, the illumination being on the same side of the targets as the camera.

FIG. 8 schematically depicts another embodiment of a position checking system. In this example, the position checking device comprises an objective lens of microscope type 1214 with coaxial illumination, and a CCD camera 121 on the same side of the targets 1221, 1231. The light generated by the illumination is reflected off the superposed targets and reaches the CCD camera 121 which captures an image or a sequence of images which are enlarged by virtue of the objective lens 1214. As above, a viewing module 1210, for example a computer program, processes the images captured by the CCD camera so as to check the positioning of the targets and perform or store a correction via numerical control 1211.

Other positioning references could be conceived of for checking the positioning of the tool holder or tool holders relative to the workpiece support. By way of nonlimiting example, capacitive, inductive, magnetoresistive systems or mechanical feelers could be employed for this purpose.

REFERENCE NUMERALS USED IN THE FIGURES

110 Machining module
112,212 Protective cover
112a Sidewall
112b Sidewall
112c Top wall
112d Bottom wall connected to the bed
112e Rear wall
112f Front wall
114 Enclosure
120 Machining assembly
121 Position checking device
1210 Viewing module
1211 Numerical control
1212 Illumination
1213 Microscope-type objective lens
1214 Objective lens with coaxial illumination
122 Removable tool holder
1220 Group of tools
1221 Tool holder positioning reference, for example target
1222 Target support
1223 Tool holder fixing device
1224 Tool holder x-position correcting device (motor)
1225 Encoder for motor 1224
1226 Tool holder y-position correcting device (motor)
1227 Encoder for motor 1226
1228 Tip of one of the tools
123 Workpiece support (barrel, chuck and/or clamp)
1231 Workpiece support positioning reference, for example target
1232 Workpiece support fixing device
124 Headstock spindle
125,225 Tailstock quill (or counter spindle)
126 Support base
127 Barstock magazine
128 Chip pan
129 Oil pan
130,230 Movable carriage
132 Guide rails
140,240 Vapor extraction duct
142,242 Warning lamp
210 Setting-up unit
260 Sensor or camera
261 Screens

What is claimed is:

1. An assembly of accessories for a machining module that machines by the removal of chips, comprising:
   at least one tool holder equipped with a first optical target as positioning reference; and
   a workpiece support equipped with a second optical target as positioning reference, the first optical target and the second optical target being designed to collaborate to be mutually aligned and superposed so as to allow their relative position to be measured through geometrical optics and their relative direction of travel to be measured through geometrical optics when the first optical target and the second optical target are superposed.

2. The assembly of accessories as claimed in claim 1, at least one said tool holder being designed to be mounted removably on a carriage of a machining module.

3. The assembly of accessories as claimed in claim 2, wherein at least one group of tools, said group of tools comprising several tools next to one another, said group of tools is attached to said tool holder.

4. The assembly of accessories as claimed in claim 1, the workpiece support being designed to be mounted removably on a machining module.

5. The assembly of accessories according to claim 1, wherein the first optical target is physically mounted separately from the tool and wherein the second optical target is physically mounted separately from the workpiece.

6. The assembly of accessories according to claim 1, wherein the first optical target is physically mounted separately from the tool holder and wherein the second optical target is physically mounted separately from the workpiece support.

7. The assembly of accessories according to claim 1, further comprising an optical system for checking the relative position between the first optical target and the second optical target by capturing an image of the superposed first and second optical targets through geometrical optics.

8. The assembly of accessories as claimed in claim 7, further comprising:
an objective lens provided between the first and second optical targets and the optical system, and
an illumination generating light which is able to reach the optical system while passing through the superposed optical targets or while being reflected by the superposed optical targets.

9. The assembly of accessories as claimed in claim 7, wherein said first and second optical targets comprise a pattern facilitating the check on the alignment of the superposed first and second optical targets by said optical system.

10. A machining module comprising:
at least one tool holder equipped with a first positioning reference;
a workpiece support equipped with a second positioning reference; and
a position checking device for checking the positioning of the first positioning reference with the second positioning reference, wherein said first and second positioning references comprise first and second optical targets, respectively, said first and second optical targets being designed to collaborate to be mutually aligned and superposed so as to allow their relative position to be measured and their relative direction of travel to be measured through geometrical optics when the first optical target and the second optical target are superposed.

11. The machining module as claimed in claim 10, at least one said tool holder being mounted removably.

12. The machining module as claimed in claim 10, the workpiece support being mounted removably.

13. The machining module as claimed in claim 10, comprising a module that measures the distance between one said tool holder and a reference associated with the workpiece support.

14. The machining module as claimed in claim 10, comprising a module that measures the direction of travel of said tool holder in a frame of reference associated with the workpiece support.

15. The machining module as claimed in claim 10, equipped with a position correction device for moving at least one tool holder with respect to said workpiece support.

16. The machining module as claimed claim 10, comprising a camera for checking the positioning of said first and second optical targets by filming the superposed targets.

17. The machining module as claimed in claim 16, comprising further an objective lens and said camera on one side of the optical targets, and an illumination on the other side of said optical targets, wherein the light generated by the illumination is able to pass through the superposed optical targets and to reach the camera, wherein said camera captures an image or sequence of images that are enlarged, by virtue of the objective lens.

18. The machining module as claimed in claim 16, comprising further an objective lens with coaxial illumination, said objective lens and said camera being on the same side of the targets, wherein the light generated by the illumination is able to be reflected off the superposed targets and to reach the camera, wherein said camera captures an image or a sequence of images which are enlarged, by virtue of the objective lens.

19. The machining module as claimed in claim 16, comprising further a viewing module configured to process the images captured by the optical system or by the camera so as to check the alignment of the optical targets.

20. The machining module as claimed in claim 10, comprising an optical system capable of capturing an image of said superposed first and second optical targets through geometrical optics, so as to check the relative positioning of said first and second optical targets.

21. A method for starting up a machining module for the production of a production series of specific components, comprising:
selection of an assembly of accessories according to claim 1, said assembly of accessories being intended for the machining of said specific components;
mounting the workpiece support on a bed of the machining module;
mounting at least one tool holder on said bed;
positioning said tool holder in such a way as to superpose a first positioning reference associated with a tool holder and formed by a first optical target with a second positioning reference associated with the workpiece support and formed by a second optical target; and
capturing an image of the superposed first and second optical targets through geometrical optics.

22. The method for starting up as claimed in claim 21, comprising, during the positioning step, the alignment of said first optical target with said second optical target and after the step of capturing an image, a further step of checking the alignment of the superposed first and second optical targets by analyzing said image.

23. The method for starting up as claimed in claim 21, wherein said tool holder is removably mounted on a carriage of the machining module, the position of the tool holder with respect to the carriage being possibly moved, comprising, during the positioning step, correction of the errors in the positioning of the tool holder with respect to the carriage.

24. The method for starting up as claimed in claim 21, wherein said assembly of accessories further comprises an optical system capable of capturing an image of said superposed optical targets through geometrical optics, and wherein during said capturing step, said image of the superposed first and second optical targets is captured with said optical system.

* * * * *